Patented Feb. 26, 1946

2,395,739

UNITED STATES PATENT OFFICE 2,395,739

RESINOUS MATERIALS AND METHOD FOR THE PRODUCTION THEREOF

Arthur B. Hersberger, Lansdowne, Pa., assignor to The Atlantic Refining Company, Philadelphia, Pa., a corporation of Pennsylvania No Drawing. Application May 3, 1941,
Serial No. 391,723

18 Claims. (Cl. 260—53)

The present invention relates to the production of resinous materials from hydrocarbon oils by reaction with aldehydes and polycarboxylic acids or anhydrides thereof in the presence of a condensing agent.

An object of this invention is the preparation of resins from petroleum oil distillates, and particularly cracked tar distillates containing cyclic hydrocarbons by reaction with an aldehyde such as formaldehyde and a polycarboxylic acid anhydride such as phthalic anhydride, in the presence of a condensing agent.

A further object of this invention is the preparation of modified resins from petroleum oil fractions containing cyclic hydrocarbons by reaction with an aldehyde and a polycarboxylic acid or anhydride thereof in the presence of a condensing agent, and the further reaction or condensation of the resulting product with an additional organic compound to modify the properties of such product.

It has been proposed heretofore to prepare resinous materials by reacting aromatic hydrocarbons with aldehydes in the presence of strong condensing agents, or by reacting cracked tar distillates or aromatic petroleum fractions with aldehydes in the presence of modified condensing agents such as $H_2SO_4$, $FeCl_3$, $ZnCl_2$, and $AlCl_3$ to which has been added a substantial quantity of a lower aliphatic acid such as acetic acid.

I have found that improved resins may be produced in accordance with my invention by reacting cyclic hydrocarbons or oils containing cyclic hydrocarbons with aldehydes and polycarboxylic acids or anhydrides thereof, in the presence of a suitable condensing agent, and that such resins are superior to those produced by the prior art processes particularly with respect to color, softening point, resistance to alkalis, and resistance to weathering.

My process comprises essentially reacting an oil containing cyclic hydrocarbons with an aldehyde and a polycarboxylic acid or anhydride thereof, in the presence of a condensing agent at a temperature sufficiently elevated to effect reaction or chemical condensation of the ingredients to form a resinous material. The resinous material, after removal of the condensing agent, may be separated from unreacted oil by distillation under reduced pressure or by treatment with solvents. In one modification of my process there may be added to the reaction mixture or to the reaction product, during or after the completion of the initial reaction, an additional chemical compound or compounds to modify the properties of the resinous product.

Resins may be prepared by my process from petroleum oils and coal tar oils or fractions thereof containing substantial amounts of cyclic hydrocarbons and other compounds having the property of condensing with aldehydes and polycarboxylic acids or anhydrides thereof. Such oils or fractions may be obtained by distillation, solvent extraction, or other suitable means, of naturally occurring petroleum oils or coal tar, and products of cracking, oxidation, hydrogenation, dehydrogenation, destructive hydrogenation, or chemical treatment thereof. Among the hydrocarbons which may be employed are cracked or uncracked petroleum distillates, high boiling oils from cracked tar, styrene, indene, and cumene, the polymers thereof, or oils containing such compounds, olefin polymers, terpene hydrocarbons, and alkylated aromatic hydrocarbon mixtures produced by the hydrolysis of petroleum sludge sulfonic acids. Hydrocarbon oils containing cyclic hydrocarbons boiling approximately within the range of from 100° F. to 750° F., and preferably within the range of 250° F. to 550° F., are suitable for use in accordance with my invention. I have found that improved resins of light color may be prepared by subjecting the petroleum fraction to a preliminary treatment with a refining agent in order to remove the color-forming bodies and other highly active constituents which readily condense to form insoluble and infusible bodies. The treated oil fractions partially or completely freed of such bodies are then subjected to reaction with an aldehyde and a polycarboxylic acid or anhydride thereof, in accordance with my process. The preliminary treatment may be conducted with sulfuric acid, aluminum chloride, decolorizing adsorbents such as fuller's earth or bauxite, or other refining agents. This pretreatment should not be carried to such a degree as to remove any considerable quantity of the resin-forming constituents of the oil fraction.

Any aldehyde or compound containing an aldehyde group which has the property of condensing with cyclic hydrocarbons and polycarboxylic acids or anhydrides thereof to form resinous materials may be employed. The aldehydes may be used as such or in polymerized form. Exemplary of these aldehydes are formaldehyde, formalin, paraformaldehyde, acetaldehyde, propionaldehyde, butyraldehyde, valeric aldehyde, glyoxal, glycolaldehyde, pyroracemic aldehyde, aldol, crotonaldehyde, acrolein, glyoxylic acid, furfural, benzaldehyde, cyclohexylaldehyde, and aldehydes produced by the partial oxidation of hydrocarbon oils and waxes.

The polycarboxylic acids and anhydrides which may be employed include oxalic acid, succinic acid, malonic acid, glutaric acid, pyrotartaric acid, tartaric acid, pimelic acid, fumaric acid, maleic acid, adipic acid, phthalic acid, trimesic acid, trimellitic acid, amino polycarboxylic acids, mixtures of two or more of these acids, the anhydrides of such acids or mixtures thereof. In addition to the polycarboxylic acids and anhydrides thereof, I may employ monocarboxylic acids such as formic acid, acetic acid, propionic acid, butyric acid, and the higher homologues of this series.

In carrying out my condensation reactions to produce improved resinous materials, I may use condensation agents or catalysts such as the halides of B, Al, Fe, and Zn, and particularly $ZnCl_2$, although other agents such as $BF_3$ etherate, $BF_3$ alcoholate, $H_3BO_2F_2$, $H_3BO_2F_2 \cdot BF_3$, mixtures of $BF_3$ etherate and $H_3BO_2F_2$, sulfonic acids, $H_2SO_4$, $H_3PO_4$, and basic agents such as $NH_3$, $NH_4OH$, $NaOH$, hexamethylene tetramine, and the like may be employed. The quantity of condensing agent or catalyst utilized may vary from a few per cent up to about 25 per cent by weight of the reactants.

In accordance with my invention, the resin-producing reaction may be carried out at temperatures between 150° F. and 400° F., and preferably between 175° F. and 250° F. Reaction times may vary from a few hours to several days, times of the order of 5 to 15 hours being preferred. In general, the reaction when carried out for a relatively short time at high temperature produces dark colored resins, whereas at longer times and lower temperatures, relatively light colored resins are obtained. The proportions of the reactants may be varied considerably, depending upon the characteristics desired of the resinous products. Also, depending upon the composition and proportion of the reactants and upon the operating conditions, the resinous products obtained may range from viscous, tacky materials to hard, solid materials of relatively high softening point. I have found that the rate of resin formation may be substantially increased by employing an inert diluent which functions as a mutual solvent for the reactants, thereby permitting more intimate contact between the reactants themselves as well as the condensing agent. Mutual solvents such as chlorinated hydrocarbons, i. e., carbon tetrachloride, ethylene dichloride, and the like, or low boiling aromatic hydrocarbons such as benzene, have been found quite suitable. If desired the resin-forming reaction may be carried out under superatmospheric pressure, for example, pressures up to several thousand pounds per square inch, in order to maintain the reactants or mutual solvents substantially in the liquid phase.

In another aspect of my invention, I have found that I may modify the properties of my resinous products by adding to the reaction mixture or to the reaction product, during or after completion of the initial reaction, an additional chemical compound or compounds capable of entering into the condensation reaction, i. e., co-condensing or copolymerizing with the initial reactants or reaction product, or with themselves. For example, I may react a petroleum fraction containing cyclic hydrocarbons with an aldehyde and a polycarboxylic acid or anhydride thereof, and during the reaction or after the reaction has been completed, I may add one or more reactive chemical compounds, for example, phenol, with or without additional aldehyde, and effect further condensation whereby the phenol enters into the resin-forming reaction to modify the properties of the resinous product. A variety of chemical compounds may be employed for this purpose, including phenolic compounds such as phenol, the alkylated phenols, cresols, xylenols, the ethyl phenols, the propyl phenols, the butyl phenols, the amyl phenols, and the petroleum phenols; the polyhydric alcohols and alcohol-ethers such as ethylene glycol, propylene glycol, butylene glycol, glycerol, diethylene glycol, ethylene glycol and diethylene glycol methyl, ethyl, propyl, and butyl ethers; urea and the substituted ureas; thiourea and the substituted thioureas; and the aliphatic and aromatic mono- and diamines, including methyl, ethyl, propyl, butyl, and amyl amines, aniline, phenylene diamine; amides and diamides; aliphatic and aromatic ketones; aliphatic and aromatic esters; fatty oils, and drying oils such as tung oil, linseed oil, and the like.

My invention may be further illustrated by the following examples, which, however, are not to be construed as limiting the scope thereof.

(1) An oil fraction containing cyclic hydrocarbons was distilled from a pressure still cracked tar, and such fraction was treated with 5 pounds of 66° $H_2SO_4$ per barrel of oil, and after separation of acid sludge, was filtered through 30–60 mesh #1 fuller's earth, using 20 pounds of earth per barrel of oil. The resulting oil had a distillation over point of 468° F. at atmospheric pressure and an end point of 752° F. at atmospheric pressure (over point of 218° F. at 10 mm. pressure and end point of 502° F. at 10 mm. pressure), an A. P. I. gravity of 18.5°, a Saybolt Universal viscosity at 100° F. of 65 seconds, an A. S. T. M. color of 2, an aniline point of 106° F., and a bromine number of 11.

100 parts by weight of the above described oil was admixed with 19.6 parts by weight of paraformaldehyde, 21.7 parts by weight of phthalic anhydride, and 2.6 parts by weight of $ZnCl_2$, and the mixture was heated at 210° F. to 230° F. for a period of 8½ hours, and cooled. The reaction mixture was then diluted with 180 parts by weight of benzene to dissolve the resinous product, and the benzene solution was filtered free of unreacted solid materials and $ZnCl_2$, and then thoroughly washed with water. The benzene and unreacted oil was distilled from the resinous product, the ultimate distillation temperature being 550° F. at 3 mm. pressure. There was recovered, as a distillation residue, a resin amounting to 40.7 per cent by weight of the oil initially charged, such resin having an A. S. T. M. ball and ring softening point of 266° F., an O. D. color of 3810, and being soluble in benzene and insoluble in ethyl alcohol.

(2) 100 parts by weight of the same oil employed in Example 1 was admixed with 13 parts by weight of paraformaldehyde, 13 parts by weight of adipic acid, and 2.6 parts by weight of a condensation agent comprising $H_3BO_2F_2$ and $BF_3$ etherate. Such agent was prepared by mixing equal parts of $H_3BO_2F_2$ and $BF_3$ etherate. The $H_3BO_2F_2$ was produced by reacting $H_3BO_3$ with $BF_3$, and distilling the product to obtain a fraction boiling between 311° F. and 329° F. comprising substantially $H_3BO_2F_2$. The $BF_3$ etherate was produced by saturating ethyl ether with $BF_3$ and distilling the product to obtain a fraction boiling between 255° F. and 260° F. comprising substantially $BF_3$ etherate.

The mixture of oil, paraformaldehyde, adipic acid, and condensing agent was heated at 210° F. for a period of 5 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 65.2 per cent by weight of the oil initially charged, such resin having an A. S. T. M. ball and ring softening point of 220° F., an O. D. color of 2075, and being soluble in benzene, partly soluble in 48° petroleum naphtha, acetone, and carbon tetrachloride, and insoluble in petroleum ether and ethyl alcohol.

(3) 100 parts by weight of the same oil employed in Example 1 was admixed with 19.6 parts by weight of paraformaldehyde, 13 parts by weight of phthalic anhydride, 396 parts by weight of carbon tetrachloride ($CCl_4$), and 0.65 part by weight of a condensation agent comprising $BF_3$ etherate. The etherate was prepared substantially as set forth in Example 2. The mixture of reactants was heated at 175° F. under a reflux condenser for a period of 2 hours, and cooled. The $CCl_4$-diluted reaction mixture was filtered free of unreacted solid materials and condensation agent, and then thoroughly washed with water. The $CCl_4$ and unreacted oil was distilled from the resinous product, the ultimate distillation temperature being 550° F. at 3 mm. pressure. There was recovered, as a distillation residue, a resin amounting to 32.6 per cent by weight of the oil initially charged, such resin having an A. S. T. M. ball and ring softening point of 204° F., an O. D. color of 1990, and being soluble in benzene, acetone, and carbon tetrachloride, partly soluble in 48° petroleum naphtha, and insoluble in petroleum ether and ethyl alcohol.

(4) 100 parts by weight of the same oil employed in Example 1 was admixed with 13 parts by weight of paraformaldehyde, 13 parts by weight of phthalic anhydride, and 2.6 parts by weight of a condensation agent comprising $H_3BO_2F_2$ and $BF_3$ etherate. Such agent was prepared by mixing equal parts of $H_3BO_2F_2$ and $BF_3$ etherate, as set forth in Example 2. The mixture of reactants was heated at 210° F. for a period of 10 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 33.5 per cent by weight of the oil initially charged, such resin having an A. S. T. M. ball and ring softening point of 210° F., an O. D. color of 2030, and being soluble in benzene, acetone, and carbon tetrachloride, partly soluble in 48° petroleum naphtha, and insoluble in petroleum ether and ethyl alcohol.

(5) A straight run petroleum naphtha containing cyclic hydrocarbons having a distillation over point of 220° F. and an end point of 435° F., and an A. P. I. gravity of 52.5° was treated with 10 per cent by volume of 98 per cent $H_2SO_4$ at 180° F. for ½ hour. The treated oil was then separated from the acid sludge, and the acid sludge was diluted with 5 per cent by volume of water, and the resulting dilute $H_2SO_4$ then separated from the aromatic sulfonic acid layer. The sulfonic acids were then diluted with water and steamed at a temperature not exceeding 350° F., whereupon the sulfonic acids were hydrolyzed to alkylated aromatic hydrocarbons and dilute $H_2SO_4$. The aromatic hydrocarbons were distilled from the hydrolysis mixture, and there was recovered an aromatic hydrocarbon fraction having a distillation over point of 275° F. and an end point of 463° F., an A. P. I. gravity of 28.4, an aniline point of below −14° F., and an A. S. T. M. color of +19.

100 parts by weight of this aromatic oil was admixed with 13 parts by weight of paraformaldehyde, 13 parts by weight of phthalic anhydride, and 2.6 parts by weight of a condensation agent comprising equal parts of $H_3BO_2F_2$ and $BF_3$ etherate. The mixture of reactants was heated at 226° F. for a period of 8 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 30.4 per cent by weight of the oil initially charged, such resin having an A. S. T. M. ball and ring softening point of 153° F., an O. D. color of 176, and being soluble in benzene, 48° petroleum naphtha, acetone, petroleum ether, and carbon tetrachloride, and insoluble in ethyl alcohol.

(6) 100 parts by weight of the same oil employed in Example 5 was admixed with 26 parts by weight of paraformaldehyde, 35 parts by weight of phthalic anhydride, and 2.6 parts by weight of a condensation agent comprising equal parts of $H_3BO_2F_2$ and $BF_3$ etherate. The mixture of reactants was heated at 226° F. for a period of 2 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 54.4 per cent by weight of the oil initially charged, such resin having an A. S. T. M. ball and ring softening point of 160° F., an O. D. color of 62, and being soluble in benzene, 48° petroleum naphtha, acetone, petroleum ether, and carbon tetrachloride, and insoluble in ethyl alcohol.

(7) 100 parts by weight of the same oil employed in Example 5 was admixed with 26 parts by weight of paraformaldehyde, 4.4 parts by weight of phthalic anhydride, and 2.6 parts by weight of a condensation agent comprising $ZnCl_2$. The mixture of reactants was heated at 226° F. for a period of 10 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 28.2 per cent by weight of the oil initially charged, such resin having an A. S. T. M. ball and ring softening point of 160° F., an O. D. color of 545, and being soluble in benzene, 48° naphtha, acetone, and carbon tetrachloride, and partly soluble in petroleum ether, and insoluble in ethyl alcohol.

(8) 100 parts by weight of the same oil employed in Example 5 was admixed with 26 parts by weight of paraformaldehyde, 4.4 parts by weight of adipic acid, and 2.6 parts by weight of a condensation agent comprising equal parts of $H_3BO_2F_2$ and $BF_3$ etherate. The mixture of reactants was heated at 226° F. for a period of 5 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 47.8 per cent by weight of the oil initially charged, such resin having an A. S. T. M. ball and ring softening point of 166° F., an O. D. color of 1510, and being soluble in benzene, 48° petroleum naphtha, acetone, and carbon tetrachloride, partly soluble in petroleum ether, and insoluble in ethyl alcohol.

(9) 100 parts by weight of the same oil employed in Example 5 was admixed with 26 parts by weight of paraformaldehyde, 4.4 parts by weight of phthalic anhydride, and 2.6 parts by weight of a condensation agent comprising concentrated $H_2SO_4$. The mixture of reactants was heated at 226° F. for a period of 10 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recoverd, as a distillation residue, a resin amounting to 41.3 per cent by weight of the oil initially charged, such resin having an A. S. T. M. ball and ring softening point of 100° F., an O. D. color of 181, and being soluble in benzene, 48° petroleum naphtha, acetone, and carbon tetrachloride, partly soluble in petroleum ether, and insoluble in ethyl alcohol.

(10) 100 parts by weight of the same oil employed in Example 5 was admixed with 40 parts by weight of paraformaldehyde, 22 parts by weight of phthalic anhydride, and 3.95 parts by weight of a condensation agent comprising 2 parts of $ZnCl_2$ and 1 part of $BF_3$ etherate. The mixture of reactants was heated at 210° F. for a period of 15 hours, and cooled. The reaction mixture was then diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure. There was recovered, as a distillation residue, a resin amounting to 47.7 per cent by weight of the oil initially charged, such resin having an A. S. T. M. ball and ring softening point of 181° F., an O. D. color of 890, and being soluble in benzene, acetone, and carbon tetrachloride, partly soluble in 48° petroleum naphtha, and insoluble in petroleum ether and ethyl alcohol.

While, in the above examples, I have shown the use of specific reactants, condensing agents, and quantities, as well as specific conditions for carrying out my resin-producing process, it is to be understood that the reactants, quantities, and conditions may be varied considerably, depending upon the properties desired in the resinous products.

The resins of the present invention can be made in wide variety ranging from heavy viscous oils, which may be used in rubber compounding, adhesives, plastic compounds, and fly paper, to hard solids of high melting point, which find application in surface coating compositions, cast and moulded articles, such as enamels, varnishes, pipe coatings, inks, waterproofing, insulating compounds, and floor tile.

What I claim is:

1. A process which consists in simultaneously reacting a petroleum oil fraction containing cyclic hydrocarbons with formaldehyde and phthalic anhydride to a useful resinous material in the presence of a condensing agent, at a temperature productive of the condensation of the cyclic hydrocarbons, aldehyde, and anhydride.

2. A process which consists in simultaneously reacting a petroleum oil fraction containing cyclic hydrocarbons with formaldehyde and phthalic anhydride to a useful resinous material in the presence of $ZnCl_2$, at a temperature productive of the condensation of the cyclic hydrocarbons, aldehyde, and anhydride.

3. A process which consists in simultaneously reacting a petroleum oil fraction containing cyclic hydrocarbons with an aldehyde and a compound selected from the group consisting of polycarboxylic acids and anhydrides of polycarboxylic acids in the presence of a condensing agent at a temperature productive of the condensation of the cyclic hydrocarbons, aldehyde, and the compound selected from said group to a useful resinous material.

4. A process which consists in simultaneously reacting a petroleum oil fraction boiling within the range of from 100° F. to 750° F. and containing cyclic hydrocarbons with an aldehyde and a compound selected from the group consisting of polycarboxylic acids and anhydrides of polycarboxylic acids in the presence of a condensing agent at a temperature productive of the condensation of the cyclic hydrocarbons, aldehyde, and the compound selected from said group to a useful resinous material.

5. A process which consists in simultaneously reacting a distillate fraction of a cracked petroleum tar containing cyclic hydrocarbons with an aldehyde and a compound selected from the group consisting of polycarboxylic acids and anhydrides of polycarboxylic acids in the presence of a condensing agent at a temperature productive of the condensation of the cyclic hydrocarbons, aldehyde, and the compound selected from said group to a useful resinous material.

6. A process for producing a resinous material which consists in simultaneously reacting a petroleum oil fraction boiling within the range of from 100° F. to 750° F. and containing cyclic hydrocarbons with an aldehyde and a compound selected from the group consisting of polycarboxylic acids and anhydrides of polycarboxylic acids in the presence of a condensing agent at a temperature between 150° F. and 450° F.

7. A process which consists in simultaneously reacting a petroleum oil fraction containing cyclic hydrocarbons with a lower aliphatic aldehyde and a compound selected from the group consisting of polycarboxylic acids and anhydrides of polycarboxylic acids in the presence of a condensing agent at a temperature productive of the condensation of the cyclic hydrocarbons, aldehyde, and the compound selected from said group to a useful resinous material.

8. A process which consists in simultaneously reacting a petroleum oil fraction containing cyclic hydrocarbons with a lower aliphatic aldehyde and an anhydride of an aromatic polycarboxylic acid in the presence of a condensing agent at a temperature productive of the condensation of the cyclic hydrocarbons, aldehyde, and anhydride to a useful resinous material.

9. A process which consists in simultaneously reacting a petroleum oil fraction containing cyclic hydrocarbons with formaldehyde and a compound selected from the group consisting of polycarboxylic acids and anhydrides of polycarboxylic acids in the presence of a condensing agent at a temperature productive of the condensation of the cyclic hydrocarbons, formaldehyde, and the compound selected from said group to a useful resinous material.

10. A resin produced by the method which consists in simultaneously reacting an aromatic hydrocarbon with an aldehyde and a compound from the group consisting of polycarboxylic acids and anhydrides of polycarboxylic acids in the presence of a condensing agent, at a temperature productive of the condensation of the aromatic hydrocarbon, aldehyde, and the compound selected from said group.

11. A resin produced by the method which consists in simultaneously reacting a petroleum oil fraction containing cyclic hydrocarbons with an aldehyde and a compound from the group consisting of polycarboxylic acids and anhydrides of polycarboxylic acids in the presence of a condensing agent, at a temperature productive of the condensation of the cyclic hydrocarbons, aldehyde, and the compound selected from said group.

12. A resin produced by the method which consists in simultaneously reacting a distillate fraction of a cracked petroleum tar containing cyclic hydrocarbons with an aldehyde, and a compound from the group consisting of polycarboxylic acids and anhydrides of polycarboxylic acids in the presence of a condensing agent, at a temperature productive of the condensation of the cyclic hydrocarbons, aldehyde, and the compound selected from said group.

13. A resin produced by the method which consists in simultaneously reacting a petroleum oil fraction containing cyclic hydrocarbons with formaldehyde and a compound from the group consisting of polycarboxylic acids and anhydrides of polycarboxylic acids in the presence of a condensing agent, at a temperature productive of the condensation of the cyclic hydrocarbons, formaldehyde, and the compound selected from said group.

14. A resin produced by the method which consists in simultaneously reacting a petroleum oil fraction boiling within the range of from 100° F. to 750° F. and containing cyclic hydrocarbons with formaldehyde and phthalic anhydride in the presence of a condensing agent, at a temperature between 150° F. and 400° F.

15. A process which consists in simultaneously reacting an aromatic hydrocarbon with an aldehyde and a compound from the group consisting of polycarboxylic acids and anhydrides of polycarboxylic acids in the presence of a condensing agent, at a temperature productive of the condensation of the aromatic hydrocarbon, aldehyde, and the compound selected from said group, to a useful resinous material.

16. A process which consists in simultaneously reacting a petroleum oil fraction containing cyclic hydrocarbons with an aldehyde, an aromatic hydroxy compound, and a compound from the group consisting of polycarboxylic acids and anhydrides of polycarboxylic acids in the presence of a condensing agent, at a temperature productive of the condensation of the reactants to a useful resinous material.

17. A process which consists in simultaneously reacting a petroleum oil fraction containing cyclic hydrocarbons with an aldehyde and a compound from the group consisting of polycarboxylic acids and anhydrides of polycarboxylic acids in the presence of a condensing agent, and further reacting the resulting product with an aromatic hydroxy compound, said reaction being conducted at a temperature productive of the condensation of the reactants to a useful resinous material.

18. A resin produced by the method which consists in simultaneously reacting a petroleum fraction boiling within the range of from 100° F. to 750° F. and containing cyclic hydrocarbons with formaldehyde and adipic acid in the presence of a condensing agent at a temperature between 150° F. and 400° F.

ARTHUR B. HERSBERGER.